Figure 2:
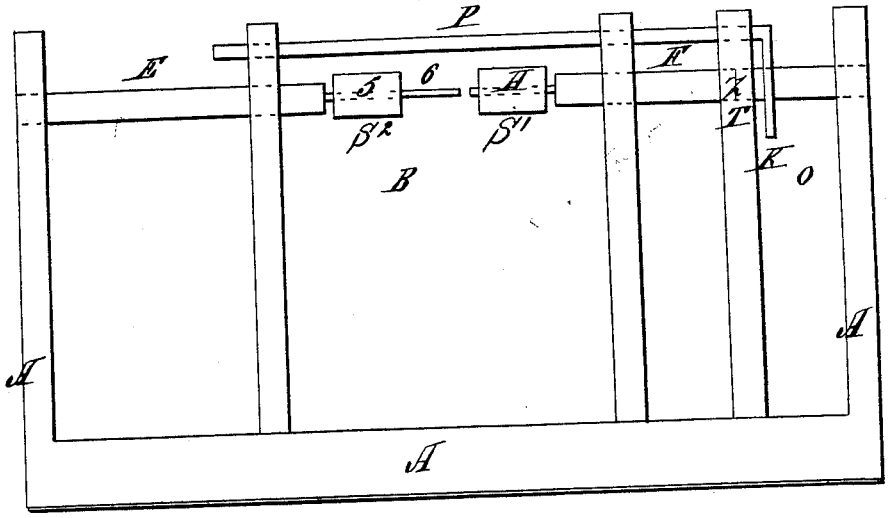
Figure 1:
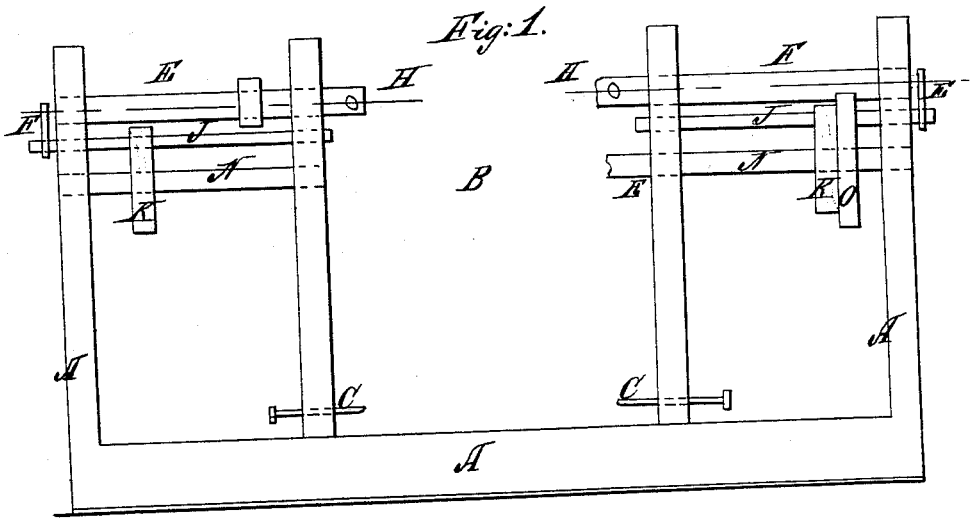

144. WOOD-WORKING,
Special Work Machines,
Combined,
Clothes-Pin.

DRAFTSMAN.

E. Parker,

Clothes Pin Machine,

No. 259, A.I. Patented Dec. 13, 1859.

Witnesses

A Herrington
L Martin

Inventor:

Ephraim Parker

AM. PHOTO-LITHO. CO. N.Y. (OSBORNE'S PROCESS).